(12) United States Patent
Rossi

(10) Patent No.: US 7,487,715 B2
(45) Date of Patent: Feb. 10, 2009

(54) UTENSIL FOR SLOW-COOK CYCLE STEAMING

(75) Inventor: Fabrice Rossi, Fontaine Française (FR)

(73) Assignee: SEB S.A., Ecully (FR)

( * ) Notice: Subject to any disclaimer, the term of this patent is extended or adjusted under 35 U.S.C. 154(b) by 1590 days.

(21) Appl. No.: 10/221,797

(22) PCT Filed: Nov. 23, 2001

(86) PCT No.: PCT/FR01/03708

§ 371 (c)(1),
(2), (4) Date: Sep. 17, 2002

(87) PCT Pub. No.: WO02/051289

PCT Pub. Date: Jul. 4, 2002

(65) Prior Publication Data

US 2004/0020374 A1    Feb. 5, 2004

(30) Foreign Application Priority Data

Dec. 22, 2000  (FR) .................................. 00 16982
Nov. 6, 2001   (FR) .................................. 01 14345

(51) Int. Cl.
*A47J 27/00* (2006.01)

(52) U.S. Cl. ..................... 99/337; 99/340; 99/403; 99/413; 219/401

(58) Field of Classification Search ........... 99/327–333, 99/403–418, 483, 339, 340, 444–450, 473–476, 99/337, 338; 219/400, 401, 415, 441; 126/381.1, 126/369, 386.1, 20; 426/509–511, 523, 418
See application file for complete search history.

(56) References Cited

U.S. PATENT DOCUMENTS

| | | | | |
|---|---|---|---|---|
| 2,622,591 A | * | 12/1952 | Bramberry, Jr. ........... | 126/381.1 |
| 3,641,926 A | * | 2/1972 | Williams et al. .............. | 99/448 |
| 3,709,544 A | * | 1/1973 | Oltmanns .................. | 294/31.2 |
| 3,746,205 A | | 7/1973 | Helguera | |
| 4,148,250 A | * | 4/1979 | Miki et al. ..................... | 99/403 |
| 4,426,923 A | * | 1/1984 | Ohata .......................... | 99/468 |
| 4,485,801 A | * | 12/1984 | Hodges et al. ........... | 126/386.1 |
| 4,509,412 A | * | 4/1985 | Whittenburg et al. ......... | 99/331 |
| 4,574,776 A | | 3/1986 | Hidle | |
| 5,119,800 A | | 6/1992 | Roberts et al. | |
| 5,275,094 A | * | 1/1994 | Naft ............................ | 99/416 |
| 6,125,264 A | * | 9/2000 | Watanabe et al. .......... | 340/7.39 |
| 6,655,264 B2 | * | 12/2003 | Rossi .......................... | 99/413 |

FOREIGN PATENT DOCUMENTS

| | | |
|---|---|---|
| DE | 3340684 | 5/1985 |
| FR | 670237 | 12/1929 |

* cited by examiner

*Primary Examiner*—Timothy F. Simone
(74) *Attorney, Agent, or Firm*—Browdy and Neimark, P.L.L.C.

(57) ABSTRACT

The invention concerns a utensil for slow-cook cycles, comprising an annular wall (14) enclosing a cooking vessel (15), and a lid (30), the annular wall and the lid being designed to be arranged on another annular wall (12) pertaining to the steam-cooker. The invention is characterized in that the lid (30) forms with the cooking vessel (15) a sealed cooking chamber (13), the lid (30) comprising at least a vent (31) provided outside the cooking chamber (13).

32 Claims, 2 Drawing Sheets

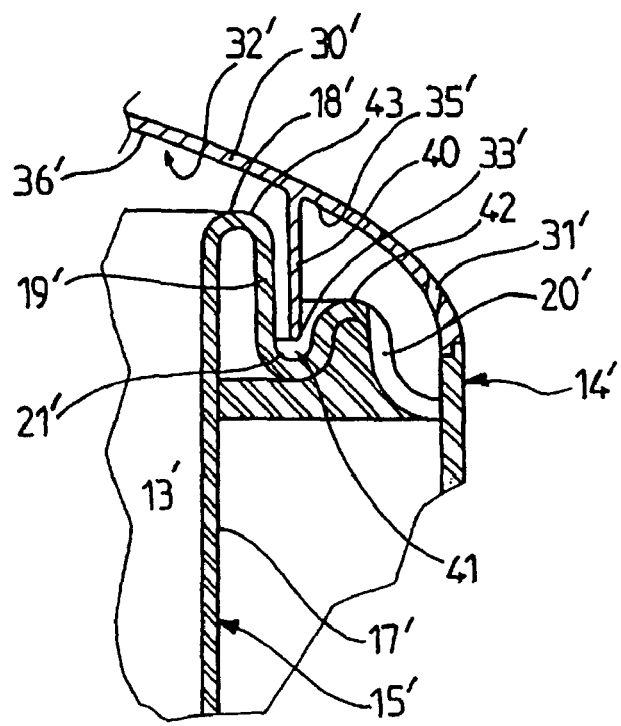
FIG. 2
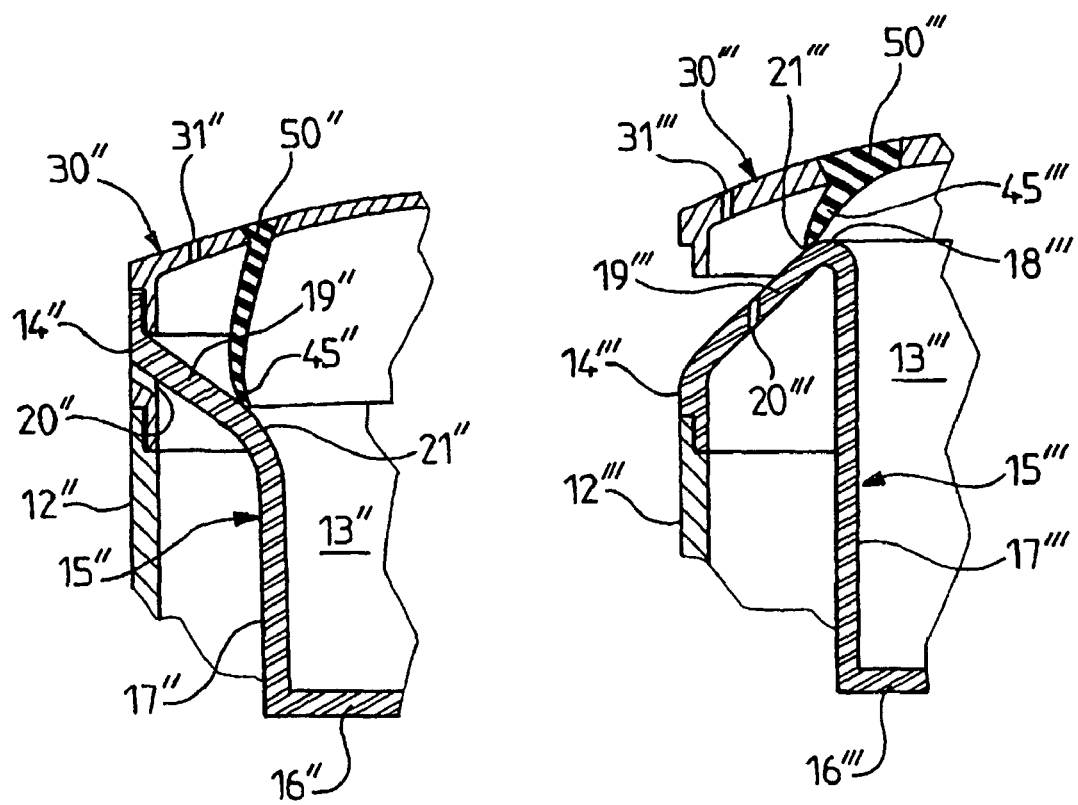
FIG. 3
FIG. 4

UTENSIL FOR SLOW-COOK CYCLE STEAMING

The present invention relates to the general technical field of apparatus or utensils for cooking with steam and concerns more particularly the apparatus or utensils designed for slow cooking.

A steam cooking apparatus has a heating base provided for the production of steam, surmounted by a cooking receptacle, or even several superimposed cooking receptacles. A lid can close off the opening of the top cooking receptacle. A receptacle for recovering juices and/or condensates can be disposed between the base and the cooking receptacle immediately above, or between two cooking receptacles. A steam cooking utensil includes a cooking receptacle closed where applicable by a lid, this receptacle being able to be disposed on another cooking receptacle, on a juice and/or condensate recovery receptacle, or on a base designed for producing steam.

Slow cooking or simmering is carried out at a temperature of less than 100|C but may last for several hours. Steam can therefore be used for carrying out this cooking. However, the cooking receptacle adapted to such a slow cooking has side walls and a bottom with no openings. In such a receptacle the heat is transmitted to the food by means of the walls, whilst in the case of conventional steam cooking using receptacles with a perforated bottom the heat is transmitted directly by the steam passing through the perforated bottom. A lid protects the food from the steam.

The document U.S. Pat. No. 4,574,776 describes a steam cooking utensil having a cooking receptacle disposed inside an enclosure heated with steam, this receptacle being closed by a lid. The enclosure is in the form of a tubular wall placed on the steam production base and closed at its top part by another lid. One drawback of this design is that the steam can condense on the lid of the cooking receptacle, which makes it necessary to take precautions for gaining access to the cooked food in the cooking receptacle.

The object of the present invention is to propose a utensil for carrying out slow cooking in a closed receptacle, able to be manipulated by the user without any particular difficulty.

Another object of the present invention is to propose a utensil for carrying out slow cooking in a closed receptacle, in which the falling of condensates into the receptacle is particularly limited.

Another object of the present invention is to propose a utensil for carrying out slow cooking in a closed receptacle used with a lid adapted to steam cooking.

These objects are achieved with a utensil for carrying out slow cooking, comprising an annular wall surrounding a cooking receptacle, and a lid, the annular wall and the lid being designed to be disposed on another annular wall belonging to a steamer, because the lid forms with the cooking receptacle a sealed cooking enclosure, the lid having at least one vent disposed outside the cooking enclosure. The lid disposed on the annular wall of the steamer makes it possible to carry out steam cooking. The excess steam then escapes through the vent or vents in the lid. When the lid is used with the cooking receptacle for carrying out steaming, or slow cooking, the food disposed in the cooking enclosure is isolated from the steam without using any additional lid. This arrangement simplifies and facilitates the manipulation of the cooking utensil, because only one lid is necessary.

Advantageously at least one passage is provided in the annular wall. This passage discharges the excess steam. The opening is preferably small in order to avoid excessively large losses of steam.

More advantageously, at least one passage is provided between the annular wall and the cooking receptacle. This passage also discharges the excess steam, but such an arrangement also avoids jets of steam to the outside. In a preferred manner, the passage then has an opening directed towards the bottom face of the lid. The opening is preferably small in order to prevent excessively large losses of steam.

Advantageously then the lid closes off the annular wall. This arrangement makes it possible to direct the steam to the vents in the lid. The risks of scalding by steam are thus reduced.

Advantageously also, several passages are provided around the cooking receptacle. This arrangement distributes the steam around the cooking receptacle and thus provides more even heating.

According to a first type of embodiment, the cooking receptacle is extended by a solid collar having an annular zone forming, with the annular zone of the lid, means of retaining an annular liquid seal. This arrangement uses the condensation of the steam on the inside face of the lid to obtain a liquid seal between the lid and the receptacle. The vent or vents are disposed at the periphery of the said annular zone of the lid. Thus the receptacle and the lid can form a sealed cooking enclosure.

Advantageously then, the cooking receptacle has a solid bottom and side walls extending as far as a top edge extended by the solid collar. Thus, when the lid is removed, the liquid which formed the joint flows away outside the cooking receptacle.

Advantageously then, the top edge is connected to the annular wall. Because of this, the solid collar is arranged between the top edge and the passage or passages. This arrangement facilitates the production of the cooking receptacle.

Advantageously, the lid has, inside the annular zone, a central bottom face having walls inclined upwards from the annular zone. This arrangement facilitates the drainage of the condensates formed on the central bottom face to the zone forming the liquid seal.

Advantageously then the central internal face is concave. This arrangement avoids condensates falling into the cooking receptacle.

Advantageously, the passage or passages are provided at one or more low points between the solid collar and the annular wall. This arrangement facilitates the recycling of the condensates formed on the peripheral internal face of the lid.

According to one embodiment, the annular zone of the lid has a distance of less than 1.5 mm from the annular zone of the solid collar. The small distance between the two annular zones allows the formation and retention of the liquid seal between the lid and the receptacle, using surface tension effects.

Advantageously then, the solid collar has sections inclined downwards in the direction of the passage or one of the passages. This arrangement makes it possible to discharge water from the liquid seal out of the receptacle when the lid is removed.

Advantageously also the cover has a concave internal face. This arrangement prevents condensates falling into the receptacle when the lid is raised from the annular wall.

Advantageously also, in order to assist the formation of the liquid seal, the annular zone has a radial section having a centre of curvature disposed under the said annular zone and a radius of curvature greater than 5 mm.

According to another embodiment, the lid has an annular rib inserted in an annular groove belonging to the collar, the annular zone of the lid being provided on the annular rib, the annular groove forming the annular zone of the collar. This arrangement makes it possible to obtain a liquid seal in the annular groove.

Advantageously, the external peripheral edge of the annular groove has at least one point lower than the internal peripheral edge of the annular groove. This arrangement prevents the liquid seal partly pouring into the receptacle if the level of the liquid seal rises.

Advantageously also, the internal peripheral edge of the annular groove corresponds to the top edge of the receptacle. This arrangement reduces the width of the collar.

Advantageously also, the solid collar has sections inclined downwards in the direction of the passage or one of the passages from the low point or one of the low points of the external peripheral edge of the annular groove. This arrangement makes it possible to discharge water from the liquid seal out of the receptacle when the lid is removed.

According to a second embodiment, the lid has an annular member forming a sealing means with a solid collar extending the cooking receptacle. This arrangement also makes it possible to obtain a sealed cooking enclosure.

Advantageously then, the annular member is an annular joint. This arrangement makes it possible to obtain a very good seal. As an alternative or in addition, an annular joint can be provided on the collar or in the receptacle. Other sealing means such as flexible walls can also be envisaged.

Advantageously also, the cooking receptacle has a solid bottom and side walls extending as far as the top edge extended by the solid collar. This arrangement prevents condensates falling into the cooking receptacle when the lid is removed.

The cooking receptacle can be integral with the annular wall, in order to facilitate the handling of the utensil.

The invention will be understood better from a study of three exemplary embodiments and one variant, taken in no way limitingly, illustrated in the accompanying figures, in which:

FIG. 2 is a partial vertical section of a variant of the exemplary embodiment shown in FIG. 1;

FIG. 3 is a partial vertical section of a second exemplary embodiment of a cooking utensil according to the invention;

FIG. 4 is a partial vertical section of a third exemplary embodiment of a cooking utensil according to the invention.

Figure 1:
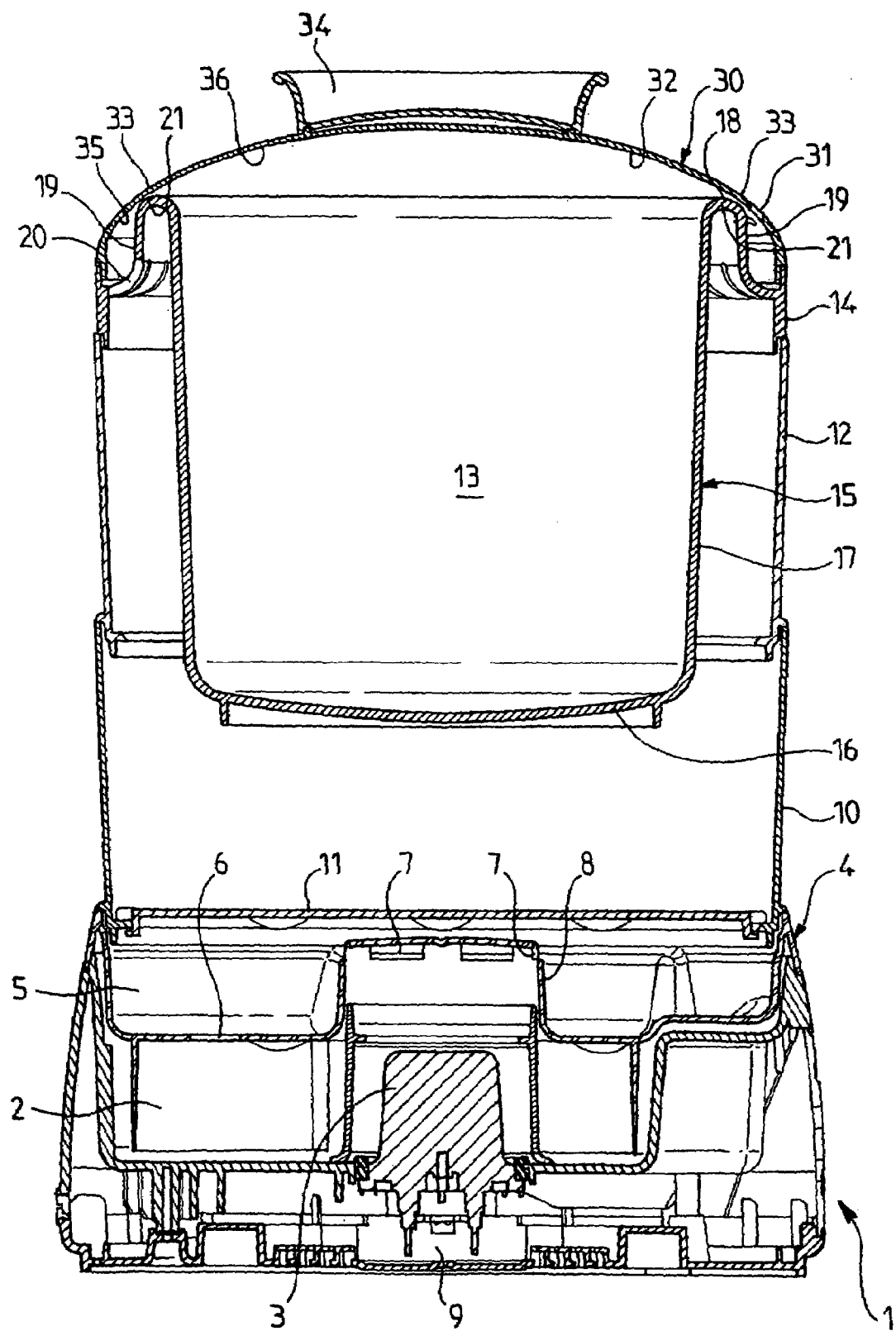
FIG. 1 is a vertical section of an electrical slow steamer having a cooking utensil according to the invention.

FIG. 1 shows an electric steamer comprising a base 1, designed for the production of steam, having a water reservoir 2 and a heating element 3 associated with an electronic control device 9 allowing functioning at full power during an initial temperature-rise phase and functioning at reduced power during the cooking phase. The reduced power can be supplied continuously or by the alternation of heating periods and periods of stoppage.

The base 1 is surmounted by an element 4 forming a recovery reservoir 5 for collecting condensates or cooking juices, in the bottom of which there is provided an opening 6 designed for the return of the condensates into the reservoir 2. One or more steam passage orifices 7 are provided in a wall 8 rising above the bottom of the reservoir 5. On the element 4 there are stacked one or more cooking receptacles closed by a lid 30.

A first cooking receptacle is formed by an annular wall 10 associated with a removable perforated bottom 11. This first cooking receptacle affords the cooking of food by direct contact with the steam. The annular wall 10 is surmounted by another annular wall 12, preferably interchangeable with the wall 10, but not necessarily identical. The annular wall 12 is surmounted by an annular wall 14 associated with a second cooking receptacle 15, designed for the slow cooking of food. The cooking receptacle 15 is surrounded by the annular wall 14, as clearly visible in FIG. 1. The lid 30 is disposed on the annular wall 14 and closes off the said wall.

However, as can be seen in FIG. 1, the lid can also be disposed on the annular wall 12 or on the annular wall 10. The user can then carry out steaming on the perforated bottom 11.

The receptacle 15 is formed by a bottom 16 connected to side walls 17 extending as far as a top edge 18 extended by a solid collar 19 which is inclined downwards. One or more passages 20 are provided between the collar 19 and the annular wall 14 to enable steam to escape through a vent 31 in the lid 30. The inclination of the collar 19 in the direction of the passage or passages 20 also enables condensates to return to the reservoir 5. Preferably the passage or passages 20 are provided at one or more low points between the collar 19 and the annular wall 14. The receptacle 15 is integral with the wall 14. Preferably several passages 20 are provided around the receptacle 15.

The cover 30 has a concave internal face 32. Because of this the internal face 32 is concave both inside and outside an annular zone 33 having a minimum distance from the annular zone 21 of the solid collar 19. Thus the lid 30 has, inside the annular zone 33, a central bottom face 36 having walls inclined upwards from the annular zone 33, and outside the annular zone 33 a peripheral bottom face 35 having walls inclined downwards from the annular zone 33. The minimum distance between the two annular zones 21, 33 is less than 1.5 mm, and is around 1 mm in the exemplary embodiment shown in FIG. 1. The lid 30 has a gripping member 34. The annular zone 21 is formed by a wall whose radial section has a curvature whose centre is disposed under the annular zone 21 and whose radius is greater than 5 mm. In the exemplary embodiment shown in FIG. 1 the radius is around 1 cm and corresponds to the radius of the top edge 18.

The annular support wall 14 and the receptacle 15 form with the lid 30 a slow cooking utensil designed to be heated by steam.

The apparatus including the aforementioned slow cooking utensil functions as follows.

The user fills the reservoir 2 with water, disposes the food to be cooked in the receptacle 15, fits the lid 30 and starts up the apparatus. During the initial temperature-rise phase the steam rises through the orifices 7 in the direction of the passages 20 in order to heat the bottom 16 and the side walls 17 of the receptacle 15, and finally escapes through the vents 31. The rise in temperature in the receptacle 15 causes the formation of steam which condenses on the bottom face 32 of the lid 30. Some of the steam which has passed through the passages 20 can also condense on the bottom face 32 of the lid 30. By virtue of the inclination of the face 32 the condensates form drops flowing towards the periphery of the lid 30. The drops are stopped at the annular zone 33 of the lid 30 through contact with the annular zone 21 of the collar 19 of the receptacle 15 and forms an annular liquid seal. The annular zone 33 of the lid forms with the annular zone 21 of the collar 19 means of retaining an annular liquid seal. The receptacle 15 is thus isolated from the steam issuing from the base 1.

Because of this, the receptacle 15 and the lid 30 form during the cooking a closed cooking enclosure 13. The vents 31 are disposed at the periphery of the lid 30 with respect to the annular zone 33, as shown in FIG. 1. The vents are disposed outside the cooking enclosure 13. Cooking at a temperature below 100° C. can be continued by virtue of the reduced power of the heating element 3. The condensation on the internal peripheral part 35 of the lid can flow over the annular walls 14, 12, 10 in order to join the recovery reservoir 5 in order to flow through the opening 6 as far as the water reservoir 2, which increases the length of time the apparatus will run. The condensation on the external face of the receptacle 15 can also fall into the recovery reservoir 5 in order to flow as far as the water reservoir 2.

When the lid 30 is removed, the liquid condensates can flow as far as the periphery of the lid 30 by virtue of the curved shape of the internal wall 32, and as far as the passages 20, because the collar 19 has sections inclined downwards in the direction of the outside of the receptacle 15 between the annular zone 21 and the passages 20. Condensates are thus prevented from falling into the receptacle 15.

The second cooking receptacle and the lid can be produced from any food-grade materials adapted to the temperatures encountered during steaming, and in particular polycarbonate, glass or stainless steel.

The variant presented in FIG. 2 differs from the previous exemplary embodiment in that the collar 19' has, around the top edge 18' of the receptacle 15', an annular groove 41 and in that the cover 30' has an annular rib 40. The groove 41 and the rib 40 form the annular zones 21', 33' allowing the retention of a liquid seal.

It will be noted that the groove 41 has an internal peripheral edge 43 lower than the external peripheral edge 42, which prevents the liquid contained in the groove from flowing into the receptacle. By way of variant the external peripheral edge 42 can have at least one low point lower than the internal peripheral edge 43.

The external peripheral edge of the groove 41 corresponds to the top edge 18' of the receptacle 15'. The passage or passages 20' are provided between the external peripheral edge 42 of the groove 41 and the annular wall 14'. The rib 40 separates the central internal wall 36 from the peripheral internal wall 35' of the lid 30'. A vent 31' is provided in the peripheral internal wall 35' of the lid 30'.

A second exemplary embodiment is illustrated in FIG. 3. The lid 30" closes off the annular wall 14" surrounding the receptacle 15" having a bottom 16" and a side wall 17". The annular wall 14" rests on an annular wall 12". The annular wall 14" can be removed, and the lid 30" then rests on the wall 12". The cooking receptacle 15" is extended by a solid collar 19" as far as the wall 14". A passage 20" passes through the wall 14" under the collar 19" to enable the excess steam to be discharged.

An annular joint 50" is mounted in the lid 30". The joint 50" can for example be moulded into the cover 30". The joint 50" bears on an annular zone 21" of the collar 19". The joint 50" thus forms an annular member 45" forming a means of sealing with the solid collar 19". The lid 30" and the cooking receptacle 15" thus form a closed cooking enclosure 13" as soon as the lid 30" is placed on the wall 14". The vents 31" are disposed on the peripheral part of the lid 30" outside the joint 50" and do not put the enclosure 13" in communication with the outside.

A third exemplary embodiment is illustrated in FIG. 4. An annular joint 50''' is mounted in the cover 30'''. The joint 50''' forms an annular member 45''' forming a means of sealing with the solid collar 19'''. The annular wall 14''' surrounds and supports the receptacle 15''' having a bottom 16''' and a side wall 17'''. The joint 50''' bears, outside the top edge 18''' of the receptacle 15''' on the annular zone 21''' of the collar 19'''. The lid 30''' and the cooking receptacle 15''' thus form a closed cooking enclosure 13'''. The lid 30''' does not bear on the annular wall 14''' but is designed to rest on the annular wall 12''' when the wall 14''' is removed. The solid collar 19''' is extended as far as the annular wall 14'''. Passages 20''' are provided around the receptacle 15''' between the collar 19''' and the wall 14'''. The vents 31''' are disposed on the peripheral part of the lid 30''' outside the joint 50'''. The vents 31''' have no function when the lid 30''' closes off the receptacle 15''', but discharge the excess steam when the lid 30''' rests on the wall 12'''.

By way of complementary variant, the annular walls 10, 12; 12"; 12''' can have two annular conformations designed to receive respectively the annular wall 14; 14'; 14"; 14''' on the one hand and the lid 30; 30'; 30"; 30''' on the other hand.

By way of complementary variant, the receptacle can be removable with respect to the annular wall, or with respect to the passages, or even with respect to the annular zone.

Also by way of variant, the lid gripping member can be replaced by handles.

The slow cooking utensil formed by the annular support wall, the receptacle and the lid can also be associated with a steam production base with no electric heating element. The steam production base is then disposed on a heating oven.

A steamer having a slow cooking utensil according to the present invention thus has a reduced number of components, since the same lid can be used for slow cooking and for steam cooking.

The present invention is in no way limited to the exemplary embodiments described and to their variants, but encompasses many modifications within the scope of the claims.

The invention claimed is:

1. Utensil for carrying out slow cooking, comprising:
a first annular wall surrounding a cooking receptacle, said first annular wall being configured to be removably disposed on a second annular wall belonging to a steam cooker; and
a lid for forming, with said cooking receptacle, a sealed cooking chamber, said lid being provided with at least one vent located outside said sealed cooking chamber, wherein:
said first annular wall is adapted to rest on the second annular wall;
said cooking receptacle has a top edge and a solid collar extending around said top edge;
each of said collar and said lid has a respective annular zone, said annular zones together forming means for retaining an annular liquid seal; and
said lid is configured to rest on the second annular wall when said first annular wall is removed from the second annular wall.

2. Utensil according to claim 1, wherein said lid has, inside said annular zones, a central bottom face having walls inclined upwardly from said annular zones.

3. Utensil according to claim 2, wherein said central bottom face is concave.

4. Utensil according to claim 1, wherein said annular zone of said lid has a spacing of less than 1.5 mm from said annular zone of said solid collar.

5. Utensil according to claim 1, wherein said annular zone of said collar has a radial section having a center of curvature disposed under said annular zone of said lid and a radius of curvature greater than 5 mm.

6. Utensil according to claim 1, wherein: said collar has and annular groove; said lid has an annular rib adapted to be inserted into said annular groove; said annular zone of said lid is provided on said annular rib; and said annular groove forms said annular zone of said collar.

7. Utensil according to claim 6, wherein said annular groove has an inner peripheral edge and an outer peripheral edge, and said outer peripheral edge has at least one point lower than said inner peripheral edge.

8. Utensil according to claim 7, wherein said inner peripheral edge of said annular groove corresponds to said top edge of said receptacle.

9. Utensil according to claim 7, wherein said solid collar has sections that are inclined downwardly in the direction of at least one passage provided between said first annular wall and said cooking receptacle, from a low point of said outer peripheral edge of said annular groove.

10. Utensil according to claim 9, wherein said at least one passage comprises a plurality of passages provided around said cooking receptacle.

11. Utensil according to claim 1, wherein said solid collar has sections that are inclined downwardly in the direction of at least one passage provided between said first annular wall and said cooking receptacle.

12. Utensil according to claim 11, wherein said at least one passage comprises a plurality of passages provided around said cooking receptacle.

13. Utensil according to claim 1, wherein at least one passage is provided between said first annular wall and said cooking receptacle.

14. Utensil according to claim 13, wherein said at least one passage comprises a plurality of passages provided around said cooking receptacle.

15. Utensil according to claim 13, wherein said at least one passage is provided with at least one low point between said solid collar and said first annular wall.

16. Utensil according to claim 15, wherein said at least one passage comprises a plurality of passages provided around said cooking receptacle.

17. Utensil according to claim 1, wherein said cooking receptacle has a solid bottom and lateral walls extending as far as said top edge of said cooking receptacle.

18. Utensil according to claim 1, wherein said top edge of said cooking receptacle is connected to said first annular wall.

19. Utensil for carrying out slow cooking, comprising:
a first annular wall surrounding a cooking receptacle, said first annular wall being configured to be removably disposed on a second annular wall belonging to a steam cooker; and
a lid for forming, with said cooking receptacle, a sealed cooking chamber, said lid being provided with at least one vent located outside said sealed cooking chamber, wherein:
said first annular wall is adapted to rest on the second annular wall;
said cooking receptacle has a top edge and a solid collar extending around said top edge and in a direction that is inclined to the horizontal;
said annular member is an annular seal forming a sealing means with said inclined solid collar; and
said lid is configured to rest on the second annular wall when said first annular wall is removed from the second annular wall.

20. Utensil according to claim 19, wherein said cooking receptacle has a solid bottom and lateral walls extending as far as said top edge of said cooking receptacle.

21. Utensil according to claim 19, wherein said annular seal bears on said solid collar at a location outside said top edge.

22. Utensil according to claim 19, wherein at least one passage is provided in said first annular wall.

23. Utensil according to claim 22, wherein said at least one passage comprises a plurality of passages provided around said cooking receptacle.

24. Utensil according to claim 19, wherein at least one passage is provided between said first annular wall and said cooking receptacle.

25. Utensil according to claim 24, wherein said at least one passage comprises a plurality of passages provided around said cooking receptacle.

26. Utensil according to claim 19, wherein said lid has a concave internal face.

27. Utensil according to claim 1, wherein said receptacle is integral with said first annular wall.

28. Utensil according to claim 19, wherein said receptacle is integral with said first annular wall.

29. Utensil according to claim 1, wherein said lid is configured to close said first annular wall when said first annular wall rests on the second annular wall.

30. Utensil according to claim 19, wherein said lid is configured to close said first annular wall when said first annular wall rests on the second annular wall.

31. Utensil according to claim 1, wherein said lid is configured to rest on said first annular wall when said first annular wall rests on the second annular wall.

32. Utensil according to claim 19, wherein said lid is configured to rest on said first annular wall when said first annular wall rests on the second annular wall.

* * * * *